(12) United States Patent
Nakanishi

(10) Patent No.: US 7,031,005 B1
(45) Date of Patent: Apr. 18, 2006

(54) PRINTER

(75) Inventor: Kanji Nakanishi, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/413,499

(22) Filed: Oct. 6, 1999

(30) Foreign Application Priority Data

Oct. 7, 1998 (JP) .................................. 10-285599

(51) Int. Cl.
*G06F 15/00* (2006.01)

(52) U.S. Cl. ........................................ 358/1.15; 358/1.9

(58) Field of Classification Search ............... 358/1.15, 358/1.18, 1.9, 540, 450
See application file for complete search history.

(56) References Cited

U.S. PATENT DOCUMENTS

| | | | |
|---|---|---|---|
| 5,831,714 A * | 11/1998 | Yoshikawa | 355/40 |
| 6,137,590 A * | 10/2000 | Mori | 358/1.17 |
| 6,157,436 A * | 12/2000 | Cok | 355/40 |
| 6,249,835 B1 * | 6/2001 | Isoda | 710/100 |
| 6,351,317 B1 * | 2/2002 | Sasaki et al. | 358/1.15 |
| 6,445,412 B1 * | 9/2002 | Shiohara | 348/333.05 |
| 6,456,391 B1 * | 9/2002 | Miyamoto et al. | 358/1.18 |

* cited by examiner

*Primary Examiner*—Kimberly Williams
*Assistant Examiner*—Saeid Ebrahimi
(74) *Attorney, Agent, or Firm*—Sughrue Mion, PLLC

(57) ABSTRACT

The present invention provides a printer which can efficiently find the desired image printed before and which can print the image quickly. The printer of the present invention has a memory installed, and the information related to the image printed before is recorded in the memory as job information. For example, a thumbnail image, a number of image files, an ID number for the SSFDC in which the image file is recorded, and so forth, are recorded as the job information. Referring to the job information, a user can efficiently find the image desired to be reprinted and the file in which the image is recorded, and quickly reprint the image.

18 Claims, 18 Drawing Sheets

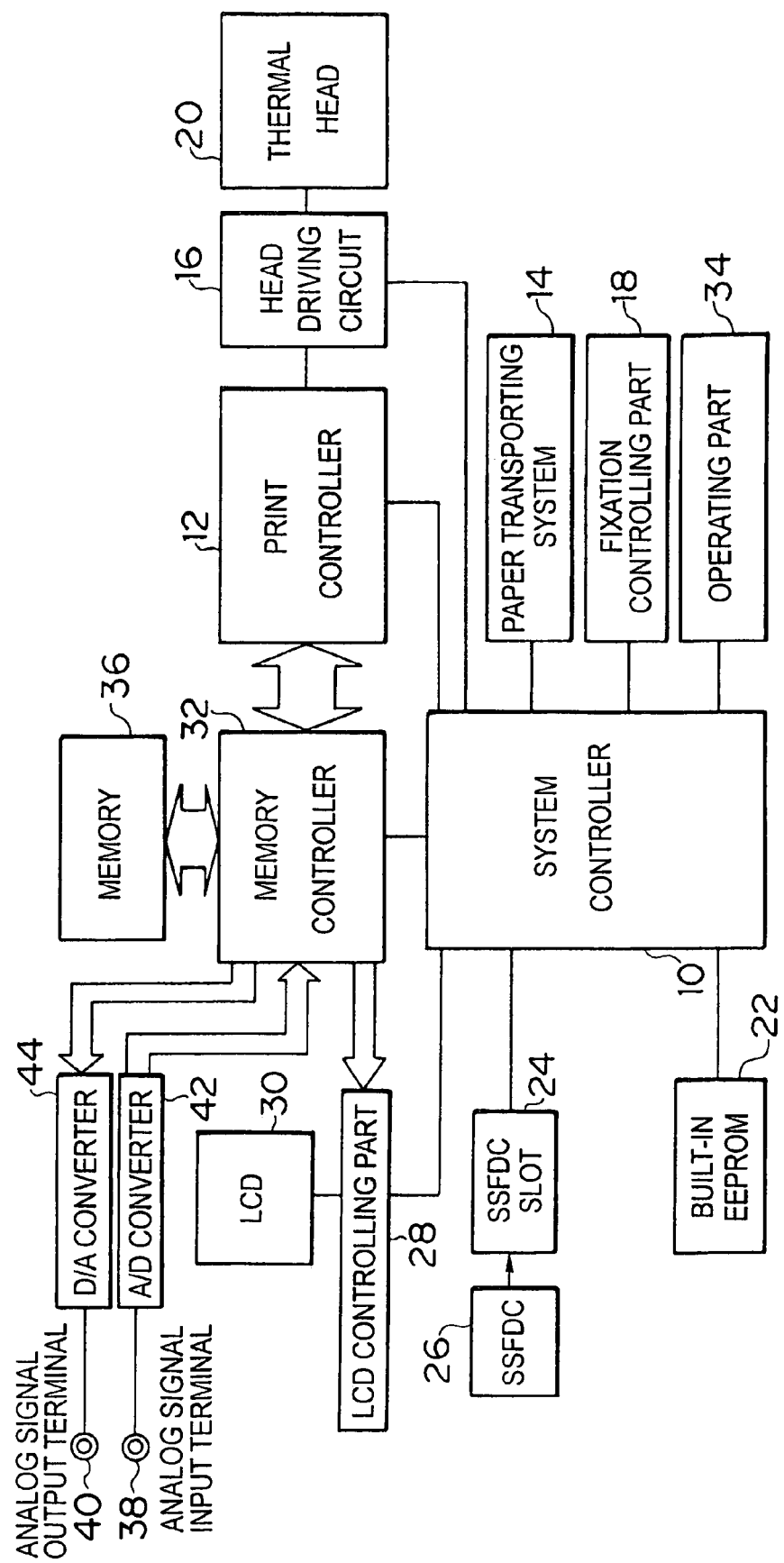
F I G. 1

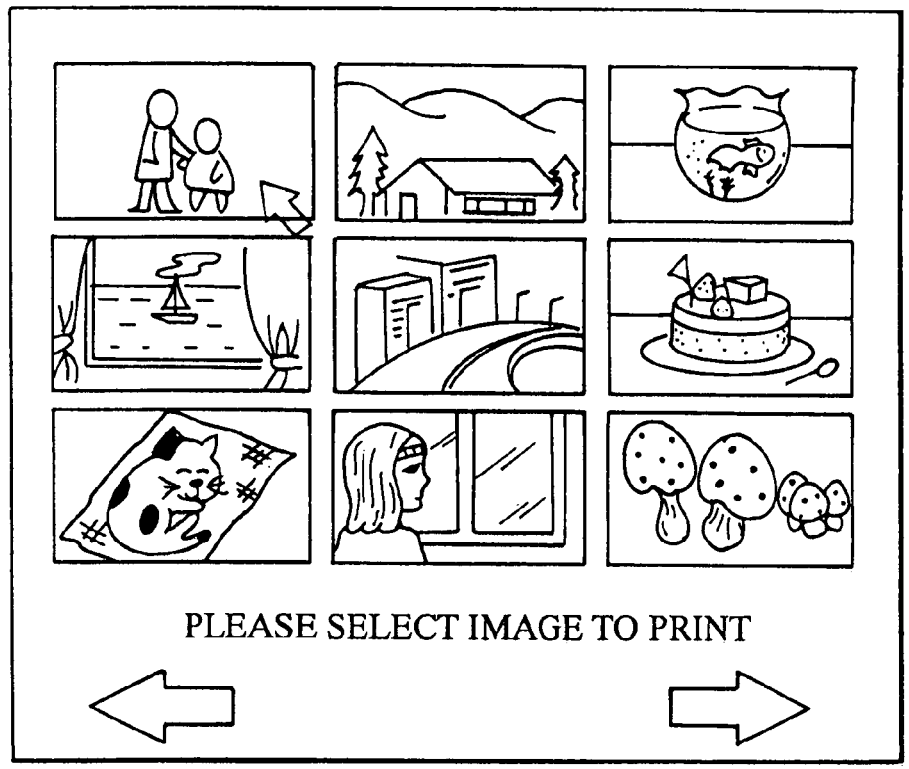

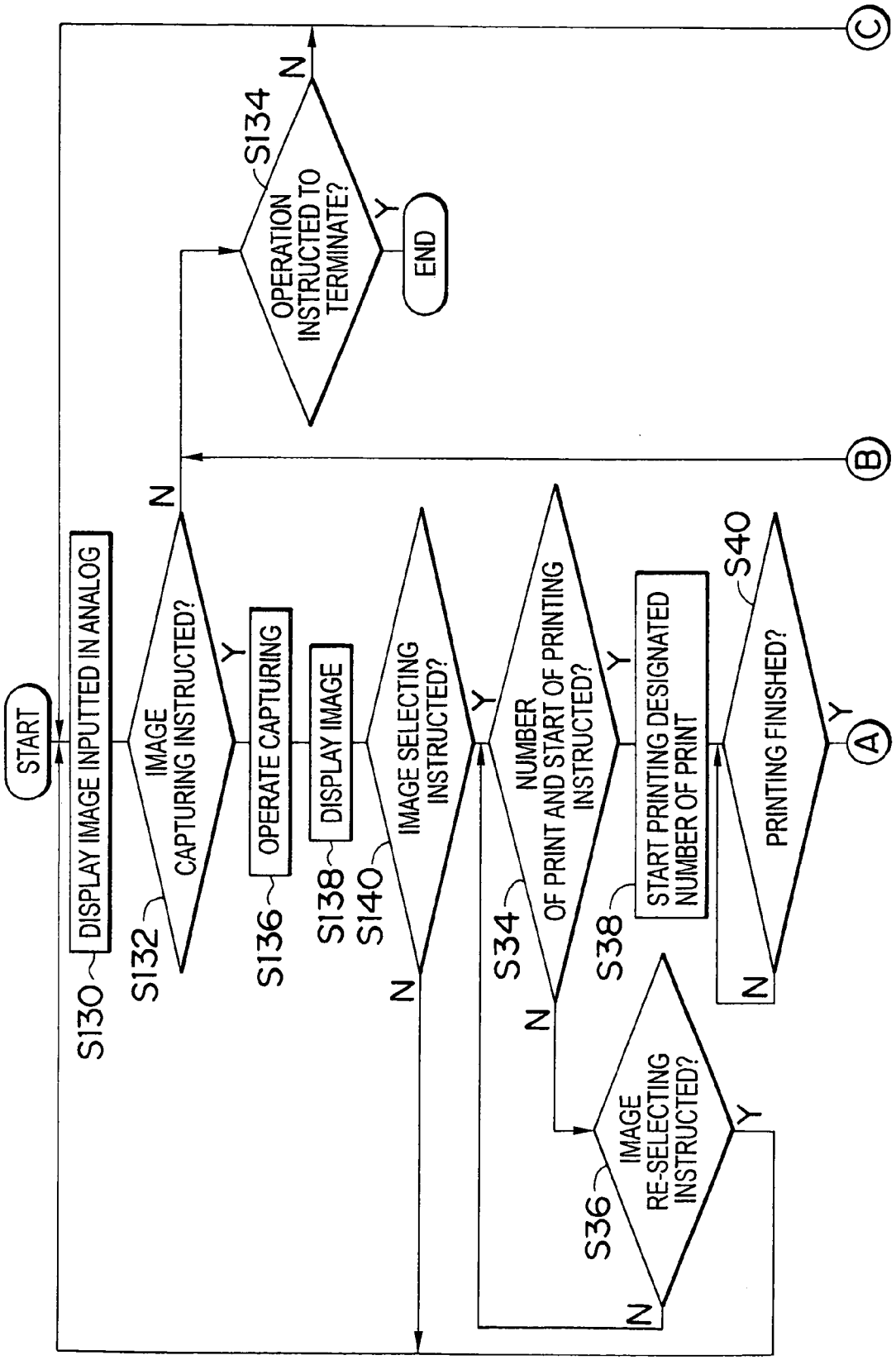

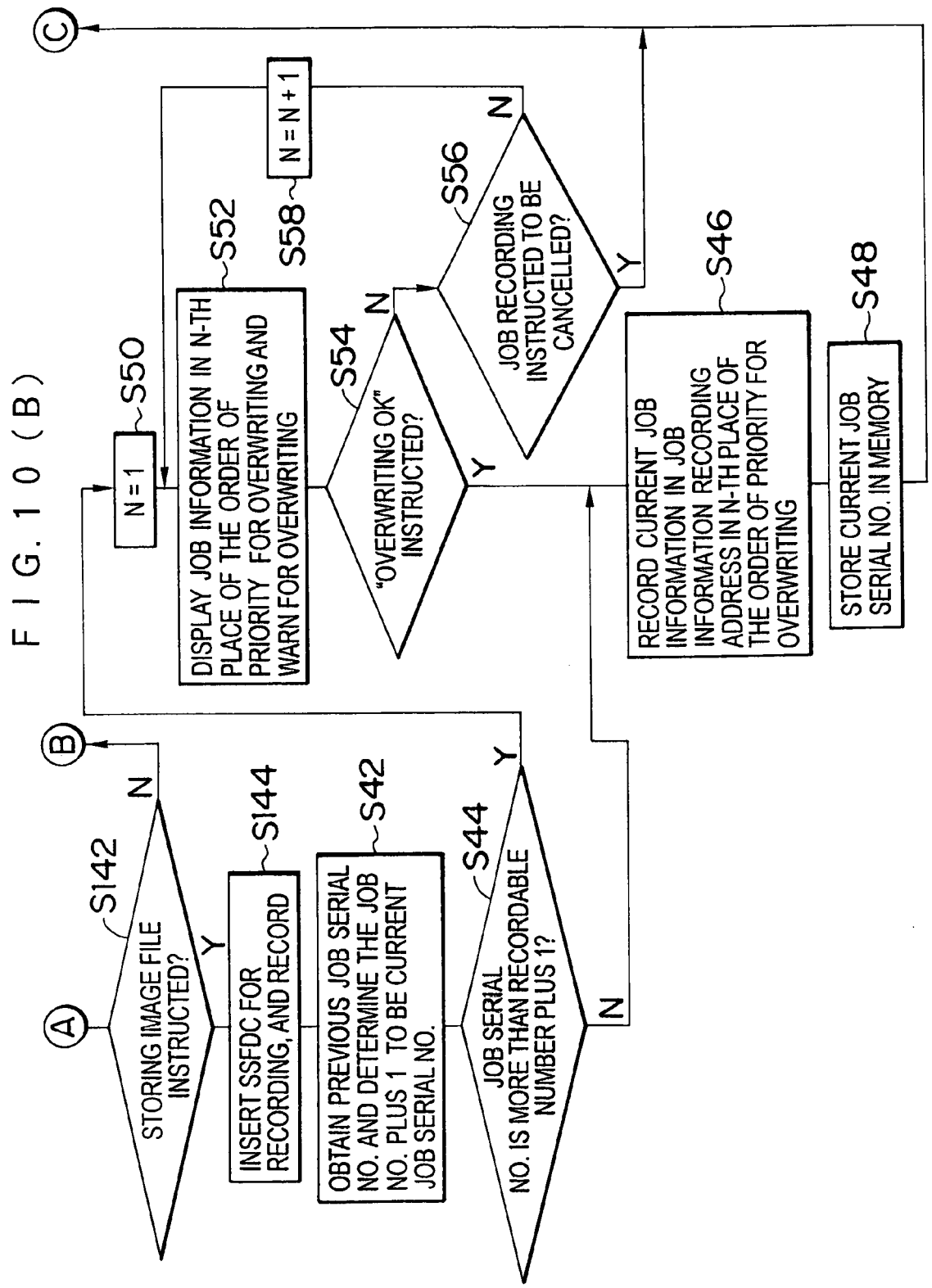

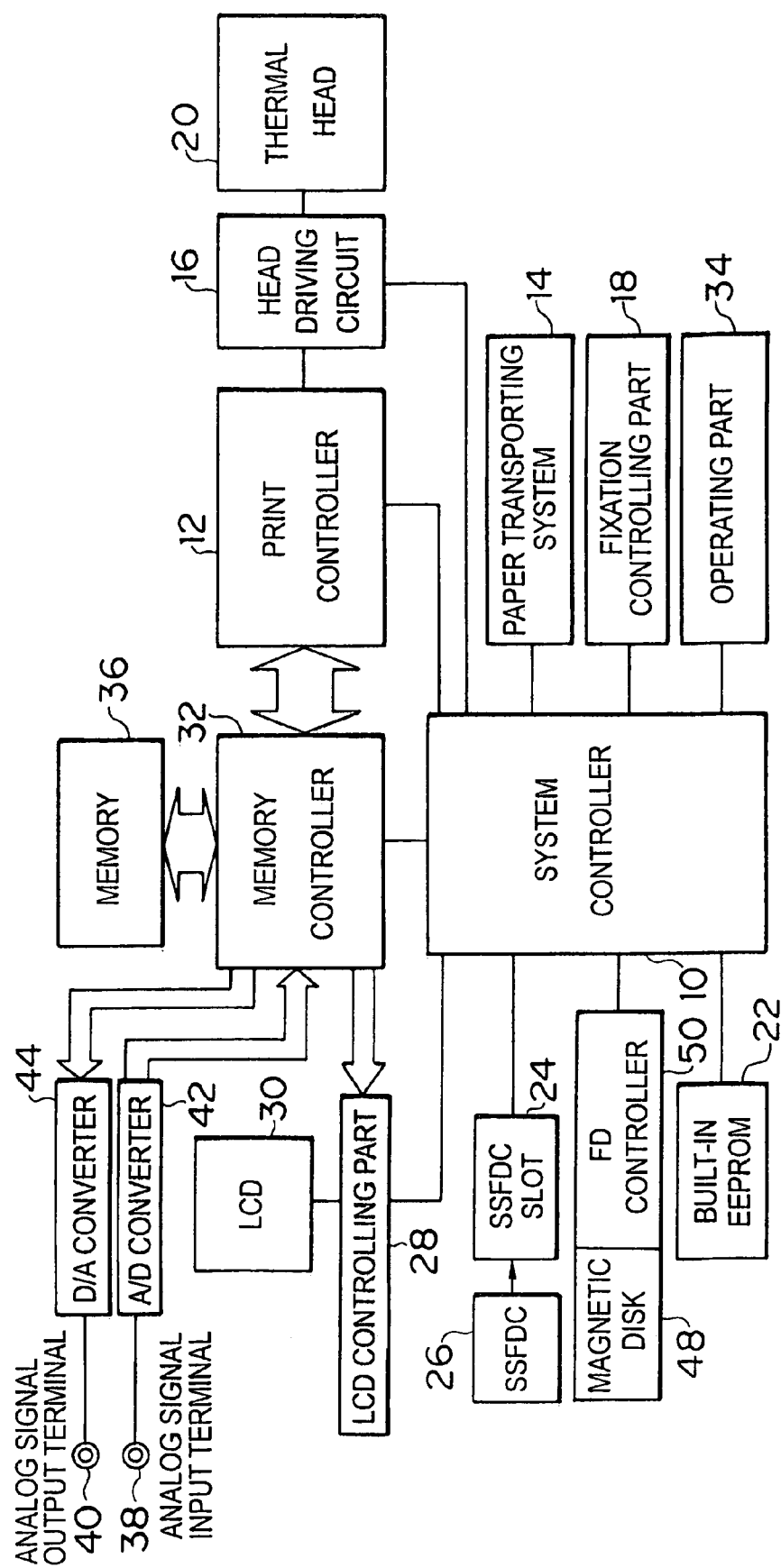

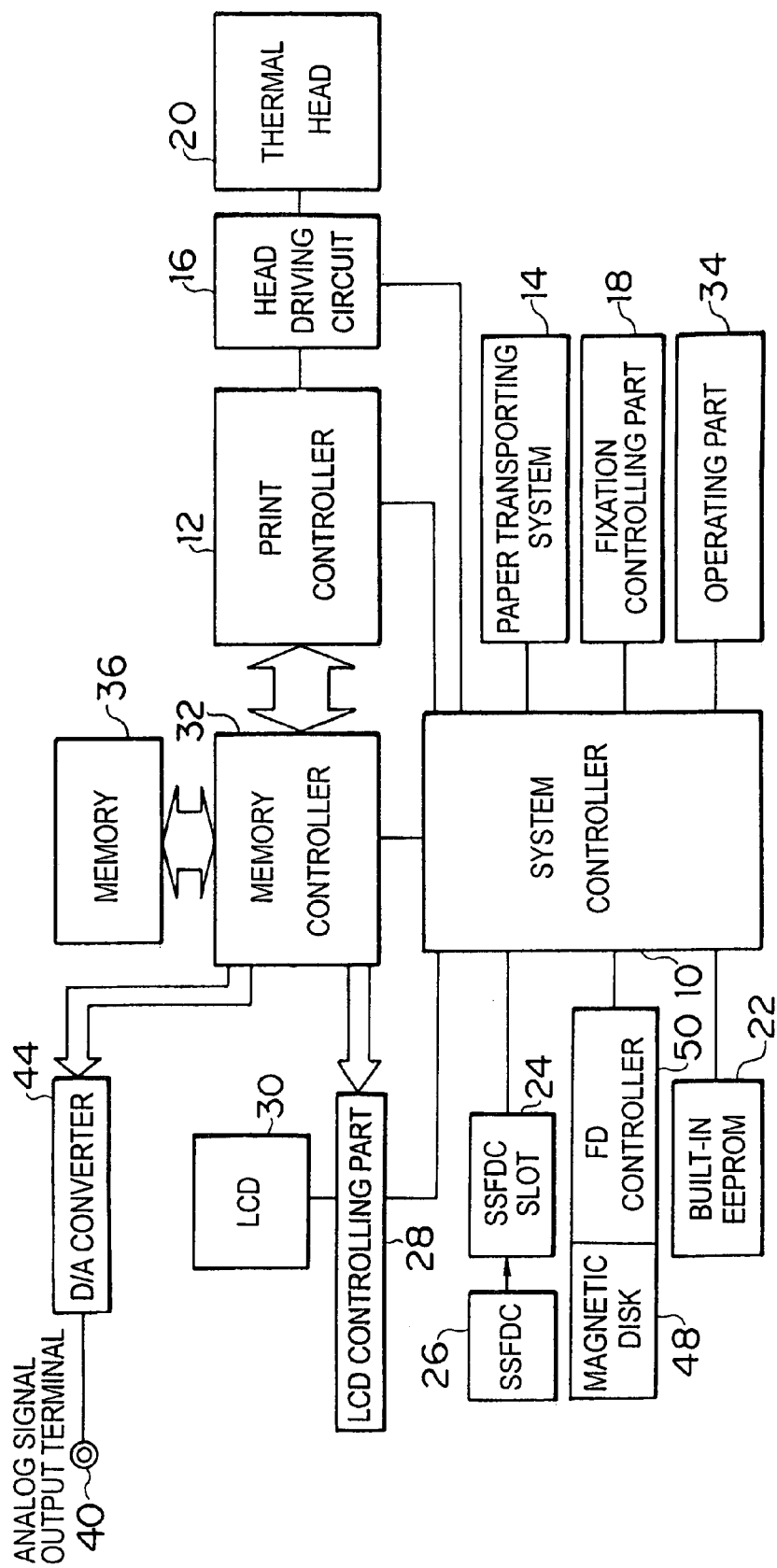

PRINTER

BACKGROUND OF THE INVENTION

1. Field of the Invention

The present invention relates generally to a printer, and more particularly to a printer capable of managing images that are previously printed.

2. Description of Related Art

Conventionally, an electronic camera such as a digital camera records a captured image into a memory card, which is loaded in the camera. When the image recorded in the memory card is required to be printed, the image is transmitted to a printer.

A printer has been manufactured in which a memory card is directly loaded without a personal computer for directly reading and printing the image from the memory card. The printer of this type has a function to display on a monitor an operation screen related to printing. The operation screen is used, for example, for displaying in a table images recorded in the memory card by a thumbnail image and displaying an image that is desired to be printed among the recorded images. Selecting and displaying the image, and operation instruction and printing instruction for images can be performed in accordance with an operation menu, which is displayed on the operation screen.

In fact, the conventional printer is not provided with a means for storing images that have been printed before. Hence, even though a previously printed image is required to be reprinted, the user must go through a time-consuming process in which the user must select the memory card in which the image to be printed is recorded relying on the user's remembrance and insert the memory card into the printer, then find the desired image among the number of image files by following the operation menu.

It would be convenient if a desired image, which is previously captured from the memory card, could be easily found later regardless of having printing it or not.

SUMMARY OF THE INVENTION

The present invention has been developed in view of the above-described circumstances, and has as its object the provision of a printer which can efficiently find a desired image printed before or captured from outside and quickly print the image.

To achieve the above-mentioned object, the present invention is directed to a printer which captures an image from outside and prints the image, comprising: a recorder which records identification information of a captured image; and a display which displays the identification information recorded by the recorder.

According to the present invention, the printer can record the identification information of the images which are captured before from outside and display the identification information; thus an image, which was captured in the printer before, can be efficiently found and quickly printed.

The recorder may record only the identification information of an image which is printed among images which are captured from outside; in this case, an image printed before can be easily and quickly reprinted.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 1 is a block diagram showing the structure of the printer of the present invention;

FIG. 2 is an instance of a printing image selecting screen;

FIG. 3 is an instance of a job information displaying screen;

FIGS. 7(A) and 7(B) are a flowchart showing a sequence of the printer for recording the job information of the printed image in case of the first printing of an image which is inputted from an analog signal input terminal of the printer;

FIG. 11 is a block diagram showing another embodiment of the printer of the present invention;

FIG. 13 is a block diagram showing still another embodiment of the printer of the present invention.

DETAILED DESCRIPTION OF THE PREFERRED EMBODIMENT

Figure 4A:
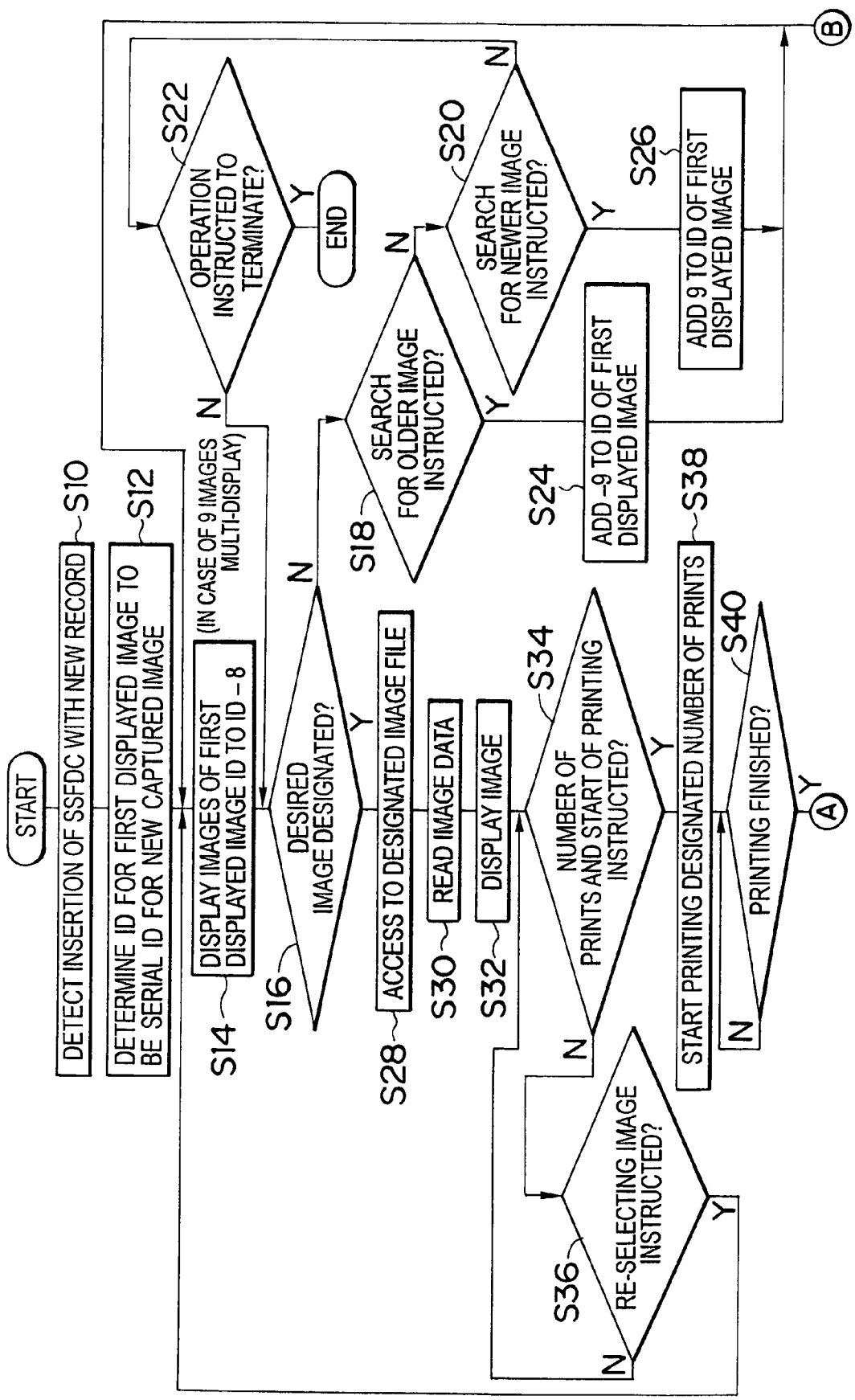
FIGS. 4(A) and 4(B) are a flowchart showing a sequence of a printer for recording the job information of the printed image in case of capturing-in the ID image data from a new SSFDC and performing the first printing.

The invention will be described in further detail by way of example with reference to the accompanying drawings.

FIG. 1 is a block diagram showing the structure of a printer according to the first embodiment of the present invention. The printer shown in FIG. 1 is applied a printing method called Thermo Autochrome (TA) method in which a printing paper, which produces color by heat and is fixed by being radiated ultraviolet rays, is used. Since the TA method is an already publicly known technology, the detail is omitted. However for example, the printing paper comprises three layers, which are yellow thermosensitive coloring layer, magenta thermosensitive coloring layer, and cyan thermosensitive coloring layer. The layers to produce and fix colors can be controlled by increasing and reducing heat energy applied by a thermal head and wavelengths of the ultraviolet rays. For example, first, a low heat energy is applied to a point to produce color by the thermal head to produce color in the top layer (yellow coloring layer) of the printing paper according to a color of each pixel of the image to be printed. After the process, the ultraviolet ray with a predetermined wavelength is applied so as to fix a color unproduced part at the top layer and settle the coloring point. Then, the heat energy applied by the thermal head is rises and the wavelength of the ultraviolet ray is changed, and the same process as the top layer is performed on the medium layer (magenta coloring layer) and the bottom layer (cyan coloring layer); after that the printing is completed.

A system controller 10 shown in FIG. 1 sends driving signals to a print controller 12, a paper transporting system 14, a head driving circuit 16, and a fixation controlling part 18, and commands each block to execute the above-described printing process. The paper transporting system 14 is a block to control transportation of the printing paper. As the printing paper starts to be transported by the paper transporting system 14, the print controller 12 sends the information of a coloring point of each layer of the printing paper to the head driving circuit 16 according to the color of each pixel of the image to be printed. The head driving circuit 16 controls a thermal element of the thermal head 20 at the same time with the transporting of the printing paper so that each layer of the printing paper produces a color. The fixation controlling part 18 makes an ultraviolet fluorescent lamp radiate the ultraviolet ray corresponding to each layer at the same time with coloring process of each layer of the printing paper, and then the ultraviolet ray with the predetermined wavelength corresponding to each layer is radiated to the printing paper and the above-described fixation process is performed. The printing method in the printer of this invention is not restricted to this, and it may be another method instead of the TA method. An erasable and electrically programmable read only memory (EEPROM) 22 shown in FIG. 1 contains an operation program of the system controller 10.

The above-described printer is provided with an SSFDC slot 24 for receiving a solid state floppy disk card (SSFDC) 26, which is a card type IC memory and is also called smart media. The printer can read image, which is recorded in the SSFDC 26 by a digital camera, from the SSFDC 26 directly without another device such as a personal computer and can print the read image.

The SSFDC 26 contains image data for reproducing the original image captured by the digital camera and various additional information, which is recorded as a form of an image file with respect to each image. The additional information includes capturing time and a thumbnail image of the image data, for example. The thumbnail image is a reduced image by reducing amount of data of the original image by a process such as thinning.

When the SSFDC 26 is inserted into the SSFDC slot 24, the system controller 10 reads the thumbnail images of image files from the SSFDC 26 and generates image data of a printing image selecting screen on which the thumbnail images are displayed in a table. Then, the system controller 10 outputs a command to display the screen to the LCD controlling part 28 as well as sends the image data of the printing image selecting screen to the LCD controlling part 28 via a memory controller 32. Thereby, as shown in FIG. 2, the printing image selecting screen on which the thumbnail images are displayed in a table is displayed on LCD 30. The user inputs from an operating part 34 an image to be printed among the thumbnail images, which are displayed on the printing image selecting screen.

As the desired image is selected in the printing image selecting screen as described above, the system controller 10 reads out the image data of the selected image from the predetermined image file of the SSFDC 26. After a predetermined signal process such as expanding the data of the compressed image is performed, the system controller 10 sends the expanded image data to the print controller 12 and the LCD controlling part 28 via the memory controller 32.

By this process the selected image is displayed on the LCD 30. Then, the user looks at the selected image again for confirmation of printing, and when the printing instruction is inputted from the operating part 34, the system controller 10 sends the driving signal to the print controller 12, the paper transporting system 14, the head driving circuit 16, and the fixation controlling part 18, and prints the selected image on the printing paper.

The printer has an analog signal input terminal 38 and an analog signal output terminal 40. As described above, the printer can capture not only the digital image from the SSFDC 26 but also an analog image signal via an A/D converter 42 from the analog signal input terminal 38, so that the image can be printed in the same manner as described above by the system controller 10 performing the predetermined signal processing to the image signal. Conversely, an image to be displayed on the LCD 30 can also be outputted to outside as an analog image signal from the analog signal output terminal 40 via a D/A converter 44.

The printer can record information to identify the printed image in the memory 36 as job information for indication of a previously performed job. The details will be described later. The system controller 10 reads the required information such as the thumbnail image of the printed image, printing time and date of the printed image, a number for the image file of the printed image, an ID number for the SSFDC 26 in which the printed image is recorded, and the cumulating number of prints of the printed image, etc. from the additional information in the image file and so forth, and records this information in the memory 36 via the memory controller 32. The number for the SSFDC 26 that is recorded and printed on the surface of the SSFDC 26 as a manufacturing serial number when it is manufactured may be used as the ID number, or the user may number the SSFDC 26. Alternatively, the printer automatically sets the ID number (e.g. printing time and date to be an ID number), and the user may be instructed to record the ID number on the label on the SSFDC 26.

The user can refer to the job information recorded in the memory 36 at an appropriate time by the instruction from the operating part 34, so that when reprinting of an image printed before is required, the job information can be used. For example, when the user instructs displaying of the job information from the operating part 34, the system controller 10 reads out the thumbnail images recorded in the memory 36 as the job information via the memory controller 32, and displays on the LCD 30 the reprinting image selecting screen on which the thumbnail images are displayed in a table like the printing image selecting screen. Next, when the user selects an image to be reprinted in the reprint image selecting screen through the operating part 34, the job information display screen displays the job information such as the time and date of print for the selected image in the past, the ID for the SSFDC (recording medium) in which the selected image is recorded, and the number for the image file in which the selected image is recorded as shown in FIG. 3. The user finds the designated SSFDC in which the selected image is recorded according to the job information, and can easily and quickly reprint the desired image by inserting the designated SSFDC into the SSFDC slot 24. The details for reprinting will be explained later.

Next, the operation of the above-described printer will be explained. The procedure for the first print by capturing the image data from a new SSFDC will be explained first using the flowchart in FIGS. 4(A) and 4(B). The same procedure will be performed in case of printing by capturing the desired image from not only the new SSFDC but also the SSFDC used before for printing.

First, the system controller 10 detects that the new SSFDC 26 in which an image file is recorded is inserted into the SSFDC slot 24 (S10), and determines an ID for the first-displayed image on the printing image selecting screen to be a serial ID for the latest-captured image, which is captured at the latest time among the recorded images in the SSFDC 26 (S12). Next, the system controller 10 reads out from the image file of the SSFDC 26 nine thumbnail images from the first-displayed ID to the first-displayed ID −8, and generates the image data of the printing image selecting screen (refer to FIG. 2) on which the thumbnail images are arranged in a table. Then, the system controller 10 displays on the LCD 30 the printing image selecting screen by sending the image data to the LCD controller 28 via the memory controller 32 (S14). In addition, the printing image selecting screen displays the nine thumbnail images in a table; however the thumbnail images are not limited to nine images. Other numbers of thumbnail images may be displayed in a table, and in that case, the thumbnail images of the number are read out from the SSFDC 26.

Following the above-process, the system controller 10 monitors inputs from the operating part 34, and determines whether or not the desired image is designated in the printing image selecting screen (S16). In other words, the system controller 10 determines whether or not the user has selected the desired image (selected image) to print. If the answer is determined to be NO, the system controller 10 next determines whether or not finding an older image than the nine thumbnail images displayed on the printing image selecting screen is instructed (S18). If the answer here is also determined to be NO, the system controller 10 determines whether or not finding a newer image than the nine thumbnail images displayed at this point on the printing image selecting screen is instructed (S20). Moreover, if the answer is determined again to be NO, the system controller 10 then determines whether or not there is an instruction to finish the operation (S22). Further, if the answer is still determined to be NO, the system controller 10 returns to S16 and repeatedly executes the determination process from S16 to S22.

On the other hand, if the user gives an instruction which corresponds to one of the determinations described above, the system controller 10 executes a process corresponds to the instruction. For instance, if the user instructs to finish the operation, the system controller 10 determines the answer to be YES at S22 and finishes the process in the flowchart. If the user instructs to find an older image than the thumbnail images displayed at this point on the printing image selecting screen, the system controller 10 determines the answer to be YES at S18, and the system returns to S14 after adding −9 to the first-displayed image ID (S24). Then, the nine thumbnail images from the changed first-displayed ID to the changed first-displayed ID −8 are read out from the image files of the SSFDC 26. Then, the system controller 10 displays on the LCD 30 the printing image selecting screen on which the thumbnail images are displayed in a table. By this process, the thumbnail images of the printing image selecting screen are switched to the older thumbnail images at the capturing time. Conversely, if the user instructs to find a newer image than the nine thumbnail images displayed at this point on the printing image selecting screen, the system controller 10 determines the answer to be YES at S20, and returns to S14 after adding 9 to the first-displayed image ID (S26). Then, the nine thumbnail images with from the changed first-displayed ID to the changed first-displayed ID −8 are read out from the image files of the SSFDC 26 and the printing image selecting screen on which the thumbnail images are displayed in a table are displayed on the LCD 30. By this process, the thumbnail images of the printing image selecting screen are switched to the newer thumbnail images at the capturing time.

As described above, the user switches the thumbnail images of the printing image selecting screen and searches the image to print, and when the user designates the image to print, the system controller 10 determines the answer to be YES at S16 and progresses to the next process.

When the image required to be printed is designated, the system controller 10 next accesses the image file in which the designated image (selected image) is recorded (S28), and reads the image data for reproducing the original image from the image file (S30). Then, after performing a predetermined signal process to the image data, the system controller 10 transfers the image data to the LCD controlling part 28 via the memory controller 32 and displays the image on the LCD 30 (S32).

Next, the system controller 10 determines whether or not the user instructed a number of prints and the start of printing from the operating part 34 (S34), and if the answer is NO, continually determines whether or not there is an instruction for re-selecting the image (S36). If the answer is determined to be NO in this case, the system controller 10 repeatedly executes the above determinations, and awaits an input from the operating part 34. If there is an instruction to re-select the image from the operating part 34, the system controller 10 determines the answer to be YES at S36, returns to the above S14, and repeatedly executes the above-described process beginning from the display of the printing image selecting screen.

On the other hand, if the number of prints and the start of printing are instructed, the system controller 10 determines the answer to be YES at S34. The system controller 10 sends the image data to the print controller 12 via the memory controller 32, and sends the driving signal to the paper transporting system 14, the head driving circuit 16, and the fixation controlling part 18 to command these blocks to start printing process for the number of prints (S38).

The system controller 10 then determines whether printing is finished or not (S40). If the answer is determined to be NO, the system controller awaits until printing is finished and if YES, executes the recording process for the job information with respect to the printed image.

In the recording process for the job information, the system controller 10 firstly obtains from the memory 36 a job serial number of the previous printing, and makes the job serial number of this time by adding 1 to the job serial number of the previous printing (S42). Then the system controller 10 determines whether or not the job serial number is larger than a value by a number of recordable job information (recordable number) of the memory 36 plus 1 (S44). If the answer this time is determined to be NO, that is, if the job serial number is in a recordable number of prints, the system controller 10 records to the job information recording address the current job information in the N-th place of the order of priority for overwriting (S46) as well as records the current job serial number to the memory 36 (S48), and returns to the process beginning from S14. The job information comprises information such as the thumbnail images, printing time and date, the number for the image file, the ID number for the SSFDC in which the image is recorded, and the accumulated number of prints. Although the order of priority for overwriting will be explained later, the process in S46 simply means recording the job information for this time in the predetermined address of the empty area of the memory 36 in a case that there is an empty area in the memory 36 such as the case in which the answer is NO at S44.

In contrast, if the answer is determined to be YES at S44, that is, the memory 36 is full, the system controller 10 firstly displays on the LCD 30 the job information in N-th place (the first place) of the order of priority for overwriting which is recorded in the memory 36 as N=1 (S50), and warns of overwriting (S52). The algorithm for deciding the order of priority for overwriting will be described later. If the job information with respect to the same image as the printed image for this time is recorded for instance, the job memory takes a higher place of the order of priority for overwriting, and if the job information is not recorded, the order of the memory for a candidate for overwriting among the job information recorded in the memory 36 is decided by the predetermined algorithm, so that the oldest job memory recorded in the memory 36 takes the higher place of the order of priority for overwriting.

The system controller 10, when displaying the job information which takes the first place of the order of priority for overwriting, determines whether or not the instruction to instruct the overwriting OK is inputted from the operating part 34 (S54), and if the answer comes out to be NO, the system controller 10 determines whether or not recording the job information is instructed to cancel recording (S56). At this point, if the answer is YES, that is, if recording of the job information is instructed to cancel recording, the system controller 10 returns to S14 without recording the job information in the memory 36. On the other hand, if the answer is NO, the system controller 10 adds 1 to N (S58), returns to S52, displays on the LCD 30 the job information which takes the N-th place (the second place) of the order of priority for overwriting, and warns of overwriting. By the same procedure, the job information with the lower places of the order of priority for overwriting is sequentially displayed on the LCD 30 as a candidate for overwriting if the instruction to instruct overwriting OK at S54 is not instructed, and overwriting is warned. If the user instructs overwriting OK by looking at the display, the system controller 10 records the job information of this time in the address (job information recording address) in which the job information in the N-th place of the order of priority for overwriting is recorded the next (S46). After that, the job serial number for this time is recorded in the memory 36, and the system controller 10 returns to S14.

By the above-described process, the job information for identifying the image printed before is recorded in the memory 36.

Additionally, a tag of the image file which printing is performed may have information that printing is finished, an accumulated printing time, and an ID for a printed image (printer ID and consecutive printing number) to be recorded therein.

Figure 5:
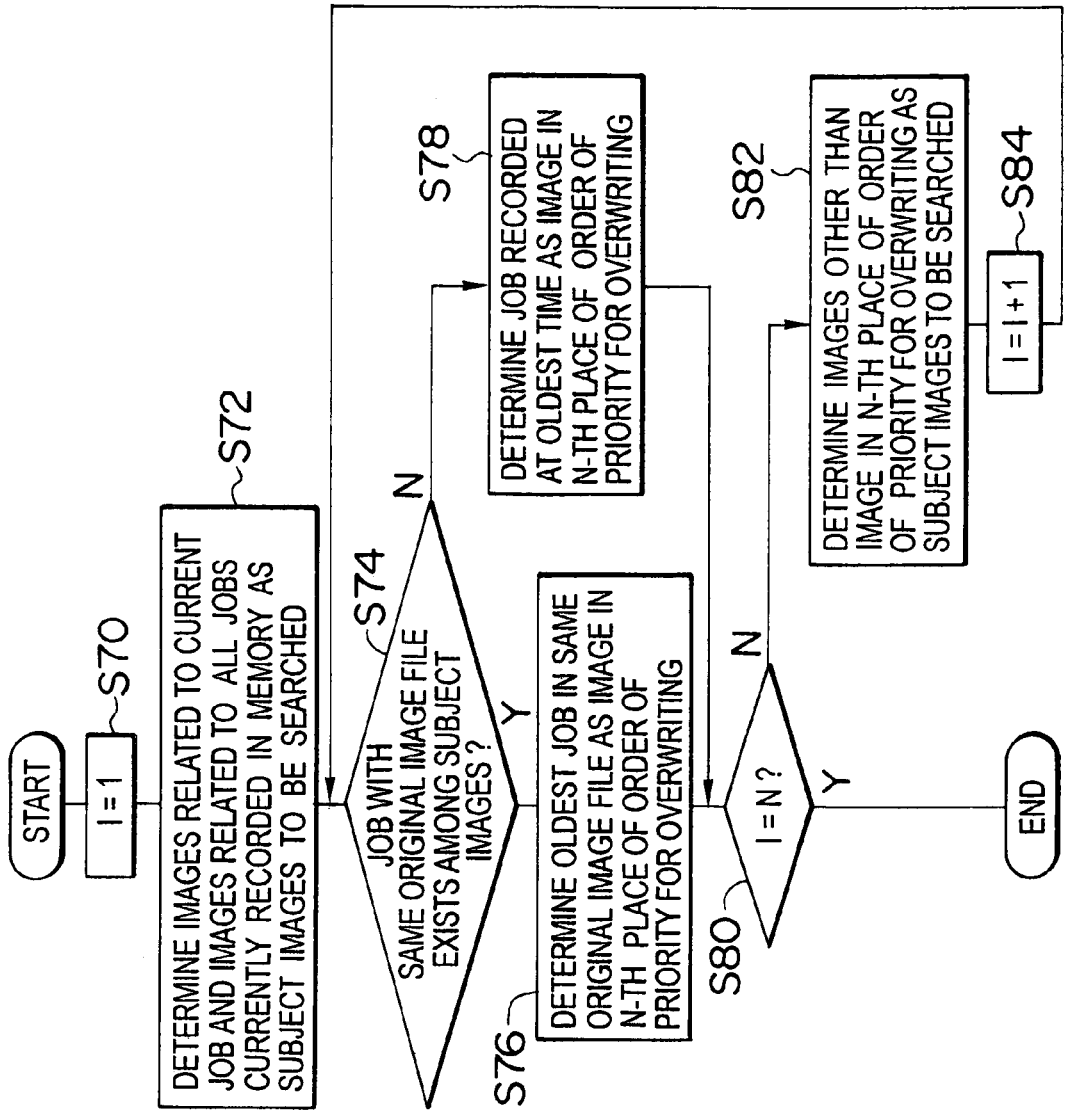
FIG. 5 is a flowchart showing an algorithm to decide an order of priority for overwriting.

Next, an algorithm for deciding the order of priority for overwriting at S52 will be explained referring to the flowchart in FIG. 5. The system controller 10 makes a predetermined parameter I to be I=1 (S70), and recognizes the images which is subject to be searched are the images which are related to the current job and images which are related to all the jobs currently recorded in the memory 36 (S72). Then the system controller 10 determines whether or not a job with respect to the image in the same image file exists among the images which are subject to be searched (S74). If the answer is YES, the oldest job in the same image file is recognized as an image in the N-th place of the order of priority for overwriting (an image which takes the priority for overwriting) (S76), where N, indicating the order of priority for overwriting, is a value N which is set at S50 or S58.

On the contrary, if the answer is determined to be NO at S74, the image which is related to the job recorded at the oldest time is recognized as the image in the N-th place of the order of priority for overwriting (S78).

Next, the system controller 10 determines whether or not I=N (S80), and if the answer is NO, the system controller 10 recognizes the images from which the image in the N-th place of the order of priority for overwriting set at S76 or S78 are excluded as the images subject to be searched the next (S82), defines I=I+1 (S84), and returns to S74. After that, the system controller 10 repeats the process from S74 with respect to the new images to be searched without the image in the N-th place of the order of priority for overwriting. If I=N is determined at S80, the system controller 10 determines the image in the N-th place of the order of priority for overwriting at that time to be the image set in the N-th place of the order of priority for overwriting, and terminates the process.

The order of priority for overwriting may be decided not only by the algorithm shown in this embodiment but also other algorithms.

Figure 4B:
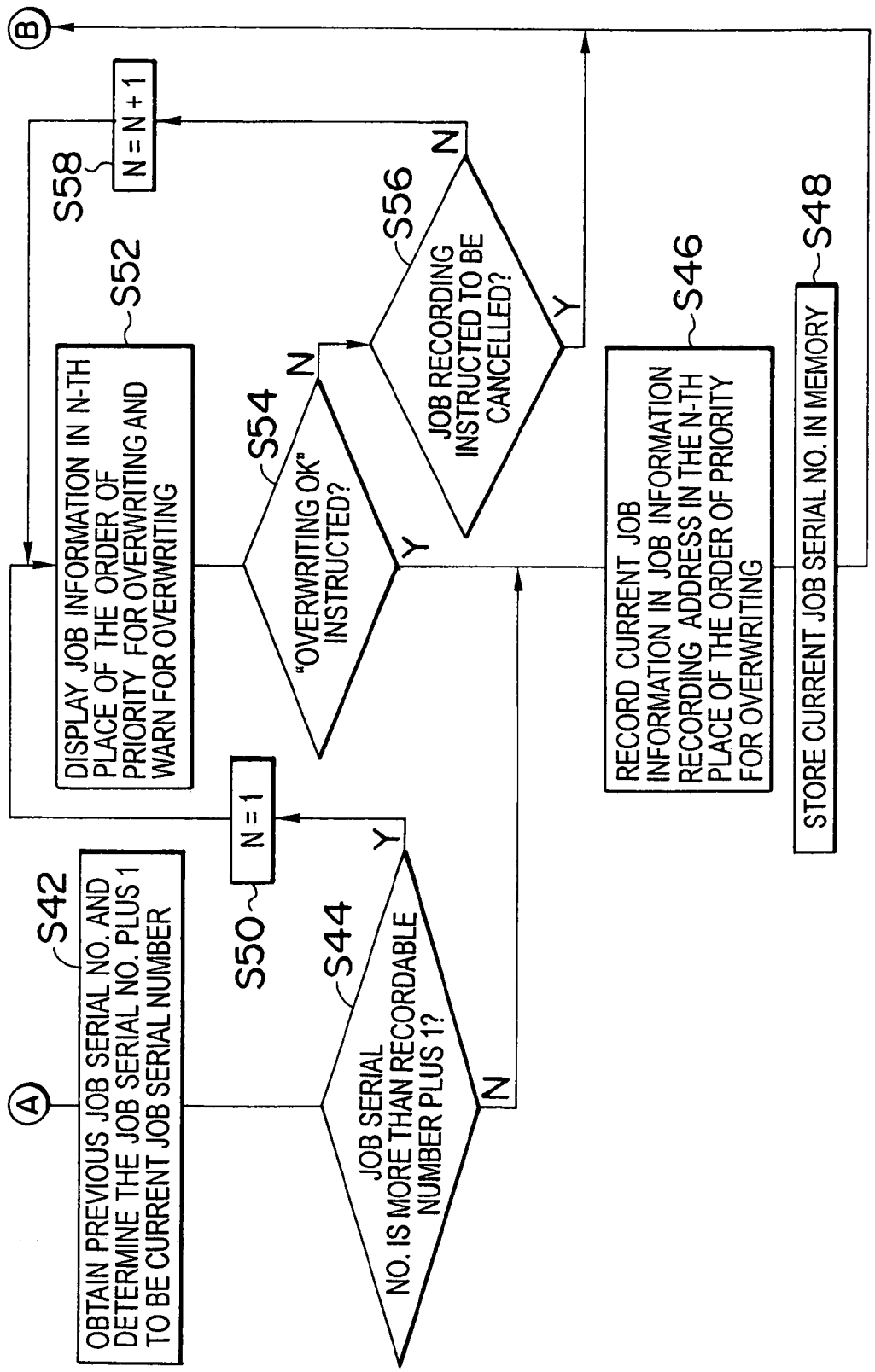
Figure 6A:
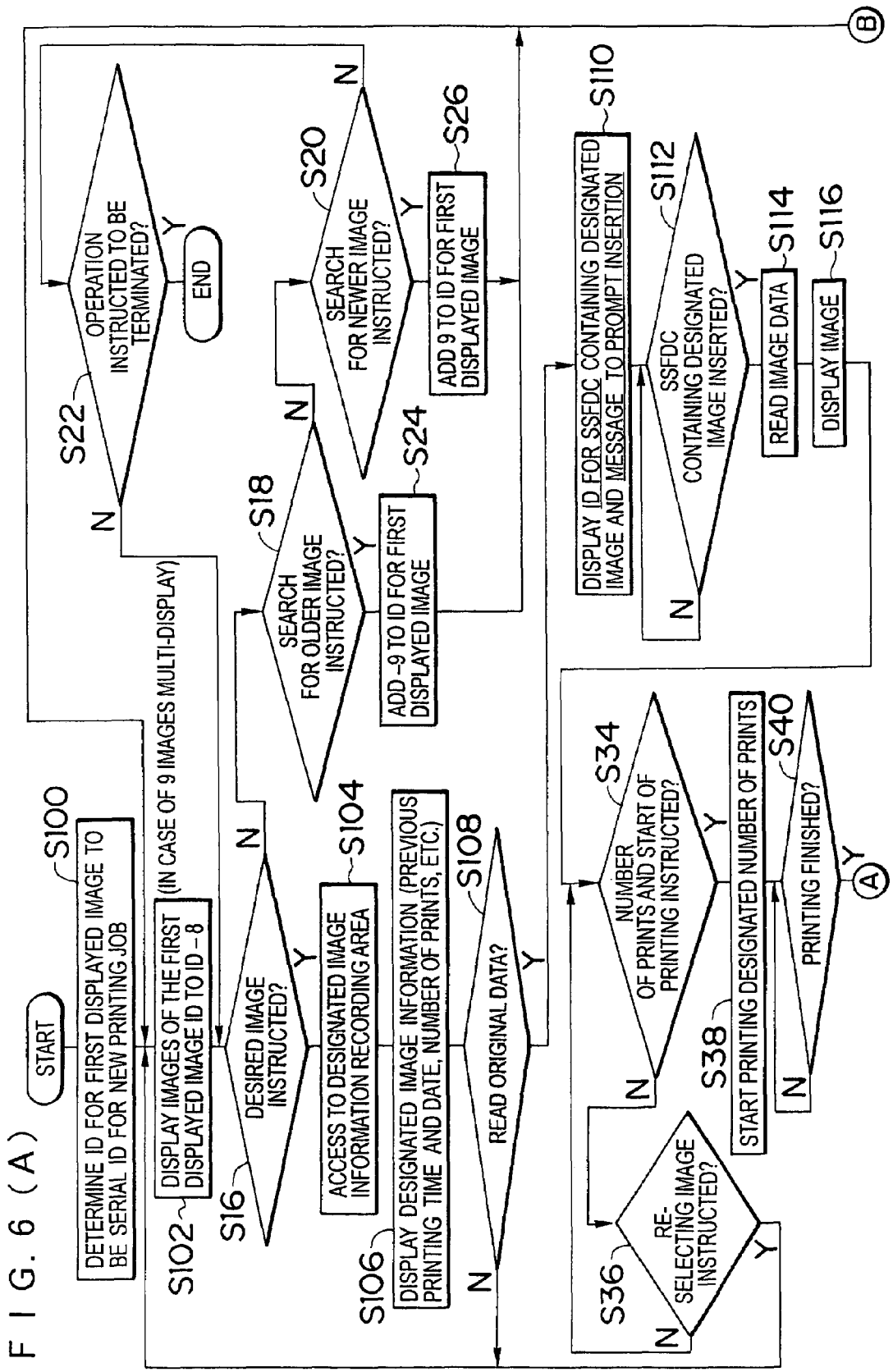
FIGS. 6(A) and 6(B) are a flowchart showing a sequence of the printer for recording the job information of the printed image in case of reprinting an image printed before using the job information.
Figure 6:
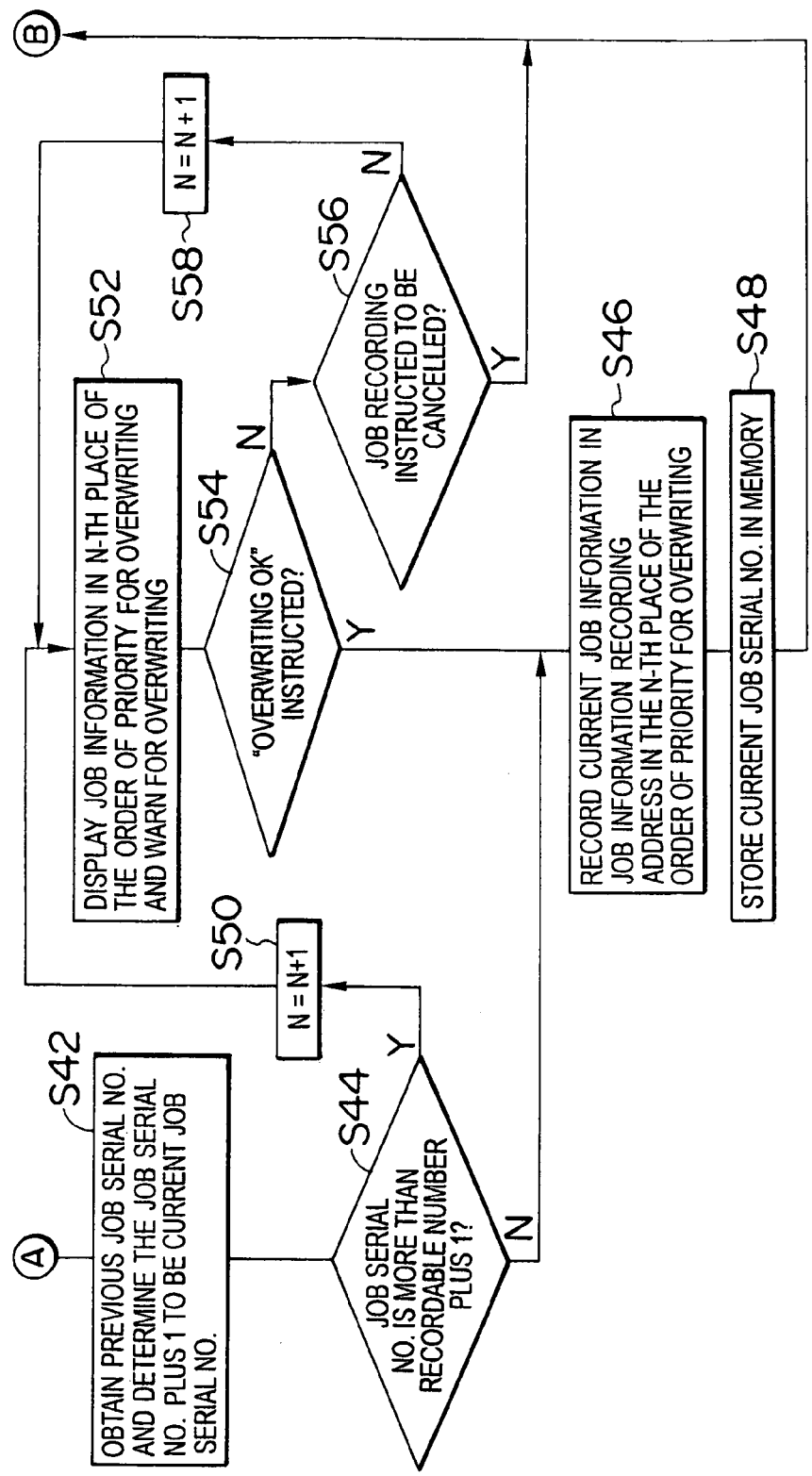

Now, a process sequence in case of reprinting an image printed once by using the job information will be explained referring to a flowchart in FIGS. 6(A) and 6(B). In this flowchart, the parts to which the same process as that of FIGS. 4(A) and 4(B) is performed have the same numbers. First, the system controller 10 recognizes an ID for the first-displayed image of the reprinting image selecting screen which is constructed the same as the printing image selecting screen as the serial ID for the new job information among the job information which are recorded in the memory 36 (S100). Next, the system controller 10 reads out from the job information recorded in the memory 36 the nine thumbnail images of the serial ID of the first-displayed ID to the first-displayed ID −8, and the system controller 10 generates the image data of the reprinting image selecting screen in which the thumbnail images are arranged in a table. Then, the reprinting image selecting screen is displayed on the LCD 30 by sending the image data to the LCD controlling part 28 via the memory controller 32 (S1102).

Following the process, the system controller 10 monitors inputs from the operating part 34, and determines whether or not the desired image is designated (S16). In other words, whether or not the user designated the desired image (selected image) to print. If the answer is NO in this determination, the system controller 10 executes the process from S18 to S26, and performs a process such as switching thumbnail images for displaying on the reprinting image selecting screen like the flowchart in FIG. 4(A). In addition, since the process of S18 through S26 is the same as the process of S18 through S26 in the flowchart in FIG. 4(A); thus the explanation for the process is omitted.

Next, if the user designates the desired image to be printed referring to the reprinting image selecting screen shown on LCD 30, the system controller 10 determines the answer to be YES at S16, and then accesses to the recording area (job information recording address) of the memory 36 in which the job information for the designated image is recorded (S104). After that the system controller 10 reads the job information of the designated image via the memory controller 32, and generates the image data of the job information displaying screen (refer to FIG. 3) for displaying the job information such as ID number for the SSFDC so as to display the job information displaying screen on the LCD 30 (S106).

Then, the system controller 10 determines whether to read or not the data of the original image of the designated image (S108), and if the answer is designated to be NO by the operating part 34, the system controller 10 returns to S102, and if YES, displays on the LCD 30 by overlapping thereon the ID for the SSFDC 26 in which the designated image is recorded and a message to insert the SSFDC 26 (S110) (refer to FIG. 3). The system controller 10 then determines whether the SSFDC 26 is inserted or not (S112), and if the answer is NO, awaits until the insertion, and if YES, progresses to the next step.

When the SSFDC 26 in which the designated image is recorded, the system controller 10 reads at S16 the image data of the designated image from the SSFDC (S114). Then the system controller performs the predetermined signal process to the image data and transfers the image data to the LCD controlling part 28 via the memory controller 32 so as to display the image on the LCD 30 (S116).

Since the process of S34 through S58 is the same as the process of S34 f5 through S58 in the flowchart in FIGS. 4(A) and 4(B), only the brief explanation will be given. The system controller 10, when number of prints and start of printing are instructed at S34, executes printing of the designated numbers (S38 and S40). Then, when the printing is finished, the system controller 10 executes the process for recording the job information with respect to the printed image in the memory 36 (S42–S58), and returns to S102.

As described above, in case of reprinting an image which is printed before, the time to find out the SSFDC in which an image to be reprinted is recorded is reduced when reprinting, because the ID number of the SSFDC 26 in which the designated image is recorded can be easily found by referring to the job information recorded in the memory 36.

Figure 7B:
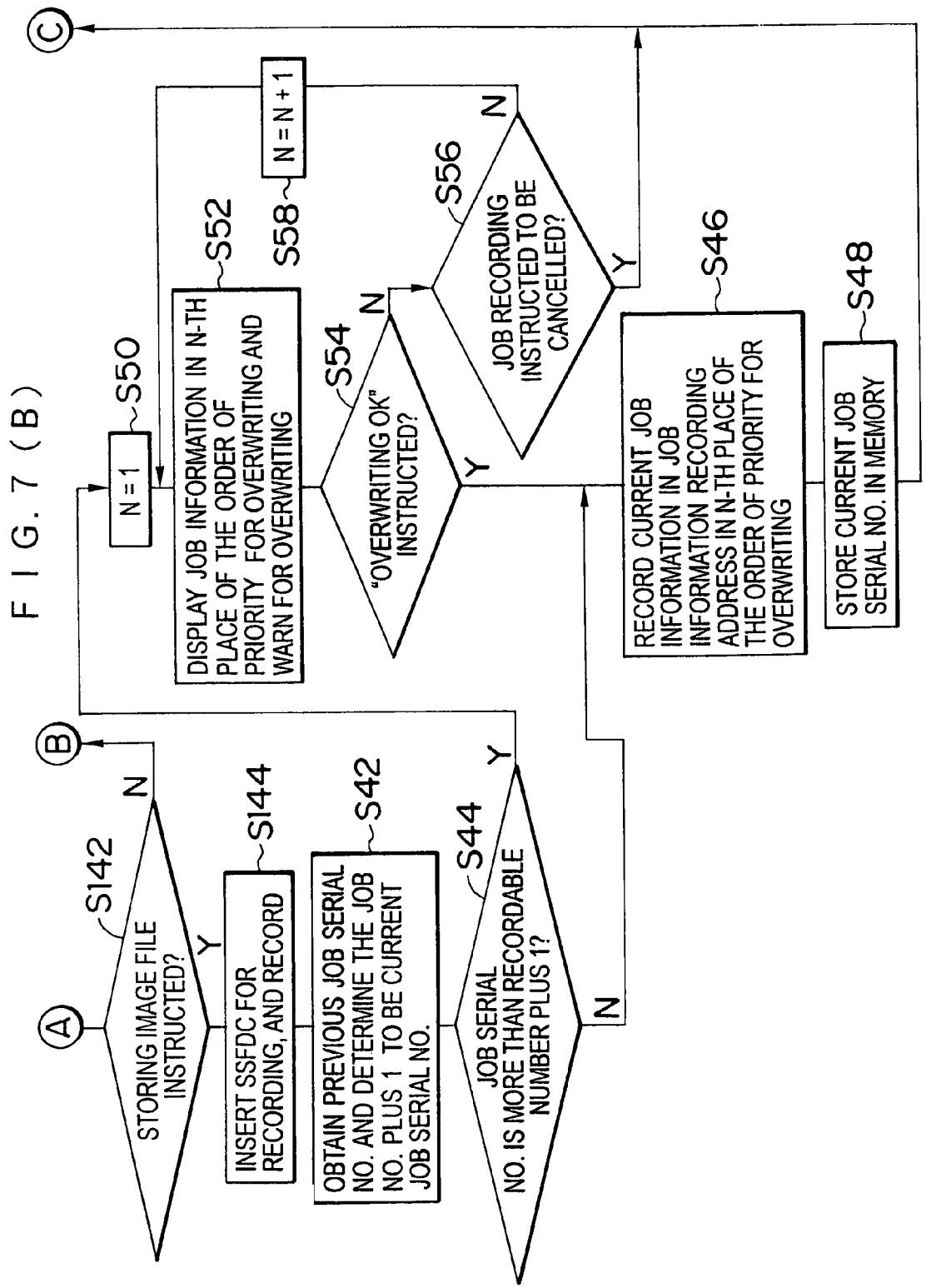

Now, the process sequence in case of the first printing of the analog image which is inputted from the analog signal input terminal 38 of the printer will be explained referring to the flowchart in FIGS. 7(A) and 7(B). In the flowchart, the same numbers are assigned to the parts to which the same process is performed as that of the flowchart in FIGS. 4(A) and 4(B). First, the system controller 10 displays on the LCD 30 the analog image to be inputted from the analog signal input terminal 38 (S130), and determines whether or not capturing image is instructed from the operating part 34 (S132). If the answer is NO, whether or not the operation is instructed to be terminated is determined (S134). If the answer is YES, the process is terminated, and if NO, the system controller returns to S130 and repeatedly executes the determination of S132 and S134. If the user instructs to capture the image from the operating part 134, the system controller 10 determines the answer to be YES at S132, and secures the image data for one screen of the analog image (S136). Then, the system controller 10 sends the image data to the LCD controlling part 28 via the memory controller 32 and displays the image on the LCD 30(S138).

Next, the system controller 10 determines whether or not selecting the image is instructed from the operating part (S140). If the answer is NO, the system controller 10 executes the process from S130, and if the answer is YES executes the process from S34 to S40. The process is the same as that of the next S34 through S40 in the flowchart shown in FIG. 4(A), thus the explanation for the process is omitted. When the number of prints and start of printing are instructed at S34, the system controller 10 executes printing of the taken image (S38).

After printing is finished, the system controller 10 next determines whether or not storing the printed image from the operating part 34 as the image file is instructed (S142). If the answer is NO, the system controller 10 returns to S134; on the other hand, if the answer is YES the system controller 10 prompts the user to insert SSFDC 26 for recording and records the image data to the SSFDC 26 as the image file (S144).

The process of S34 through S58 is the same as the process of S34 through S58 in the flowchart shown in FIGS. 4(A) and 4(B), thus the process will be described briefly. The system controller 10, when number of prints and start of printing are instructed at S34, executes the designated number of prints (S38 and S40). After the printing is finished, the system controller executes the process for recording in the memory 36 the job information for the image which is printed the next (S42~S58), and returns to S130.

By the above-described procedure, the printed image, inputted from the analog input terminal 38, can be recorded and stored in the SSFDC and the job information can be recorded in the memory 36; thus the image, inputted from the analog input terminal 38, can be reprinted like the image which is read from the SSFDC.

In the embodiments which are explained above, the job information with respect only to the actual printed image is recorded to the memory 36; however, the job information with respect to all the selected images, selected by the user by the printing image selecting screen, may be recorded in the memory 36. The operation of the printer in that case will be explained in comparison with the flowcharts shown in FIGS. 4(A), 4(B), 6(A), 6(B), 7(A) and 7(B) for recording the job information only with respect to the actual printed image.

Figure 8:
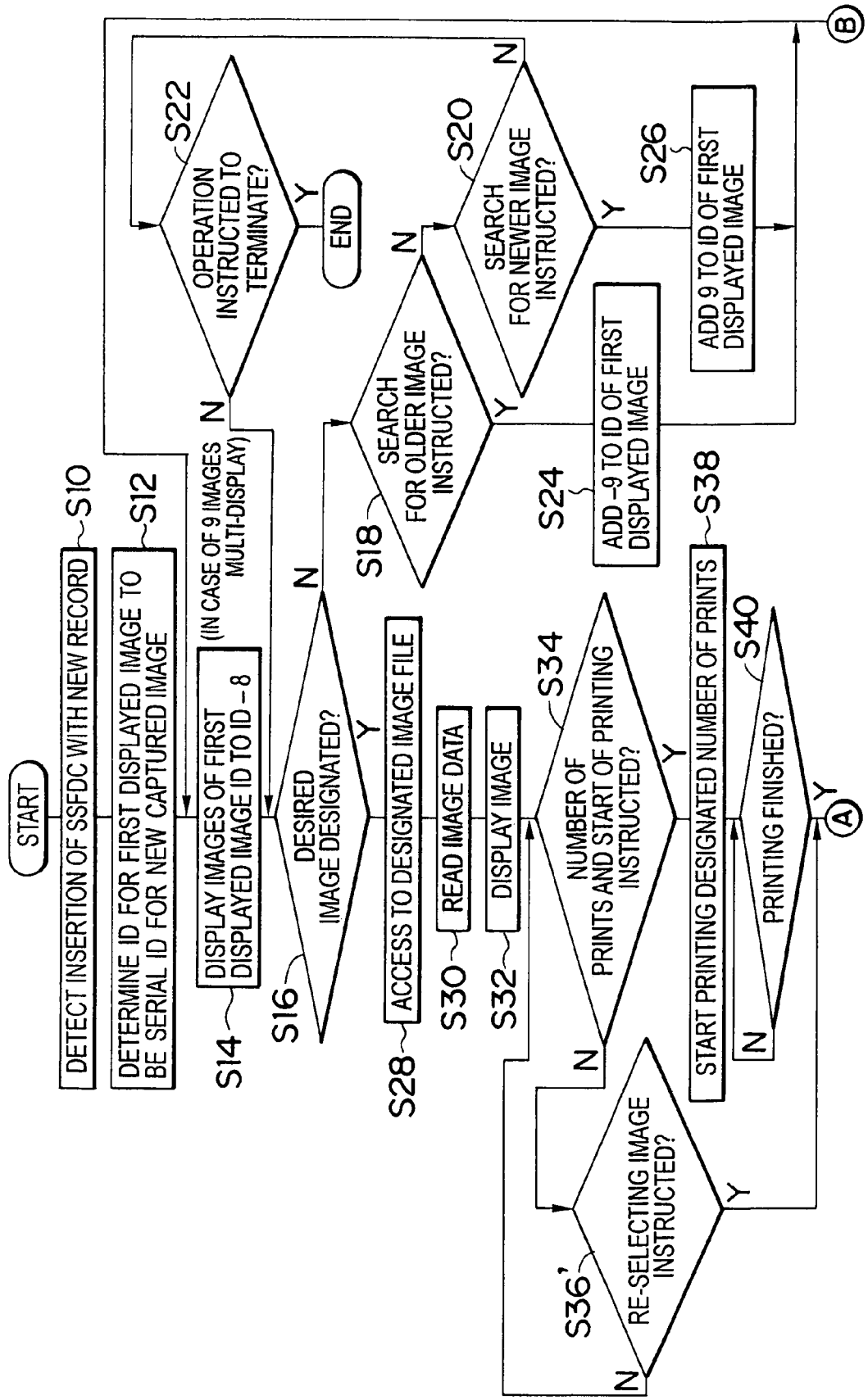
FIGS. 8(A) and 8(B) are a flowchart showing a sequence of a printer for recording the job information of the selected image in case of the first printing by capturing the image data from a new SSFDC.
Figure 8B:
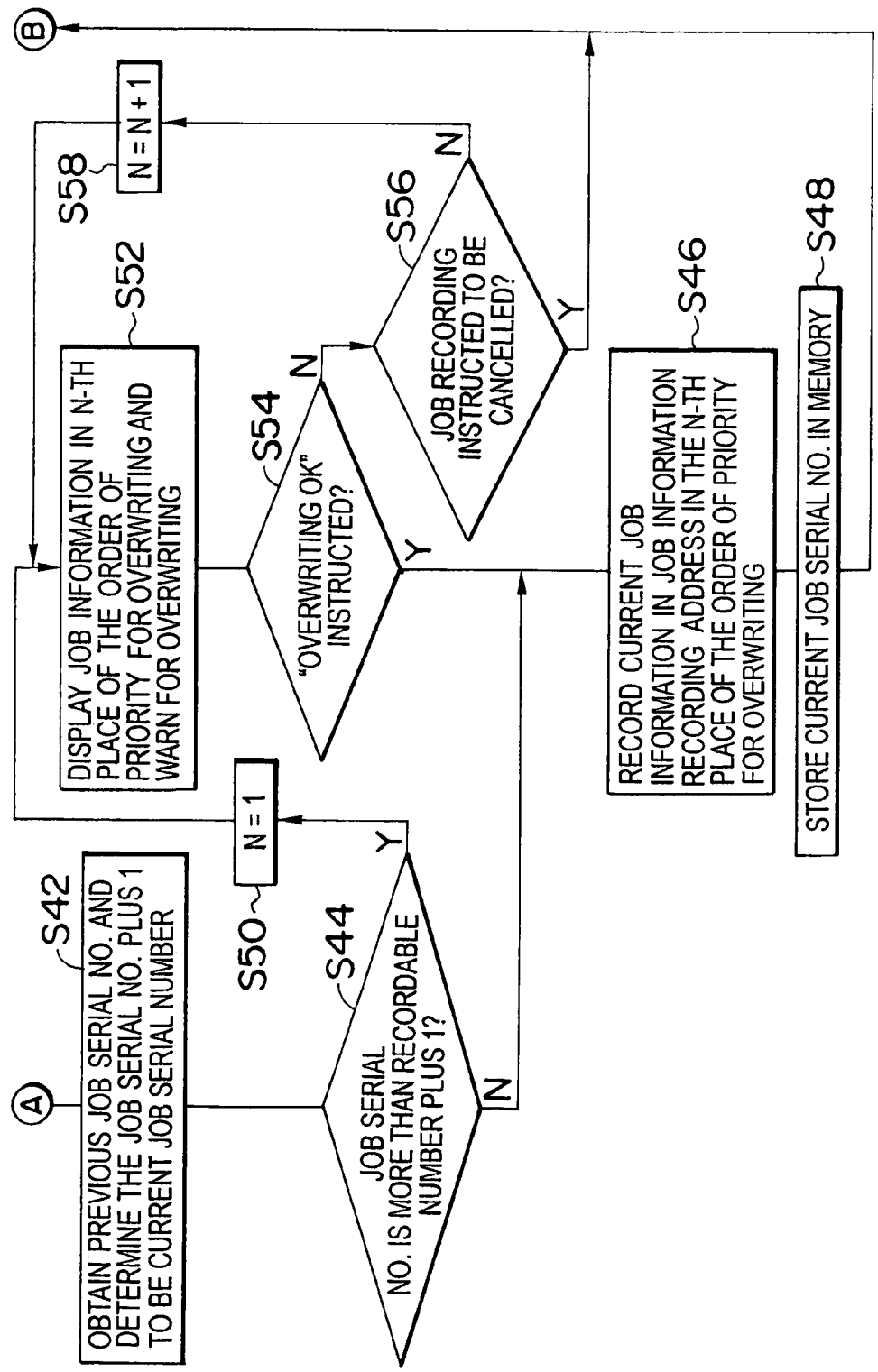

FIGS. 8(A) and 8(B) are a flowchart showing the process sequence for performing the first printing by capturing the image data from the new SSFDC 26. The flowchart is almost the same as one in FIGS. 4(A) and 4(B), and the parts on which the same process is performed are assigned the same numbers. The only difference is S36; step 36 is S36' in this flowchart.

Explaining briefly from the first process, the system controller 10 reads the thumbnail images from the SSFDC 26 and displays the printing image selecting screen on the LCD 30 (S14). After that when the user selects the desired image to be printed (S16), the system controller 10 reads the image data from the image file of the SSFDC 26 (S30), and displays the image on the LCD 30 (S32). Next, the system controller 10 determines whether or not the number of prints and the start of printing are instructed (S34), and if the answer is NO, determines whether or not reselection of the image is instructed (S36'). In this case, if the answer is determined to be YES, that is, if the selected image is cancelled to be printed, the system controller 10 returns to S14 in the flowchart shown in FIG. 4(A) without recording the job information and performs again displaying the printing image selecting screen. However, in this embodiment the system controller 10 returns to S42 even if the answer is YES, and executes the process for recording the job information. Thereby, the job information in terms of the image which is selected in the first printing image selecting screen, that is, the image on which capturing the image data is performed can be recorded without actually executing printing. The system controller 10, when the process for recording the job information which is indicated from S42 to S58 is finished, returns to S14, and again executes the process beginning from selecting the image. Regarding the image on which printing is executed after the answer is determined to be YES at S34, the image is performed the process for recording the job information beginning from S42 as shown in the flowchart in FIG. 4(B).

Figure 9:
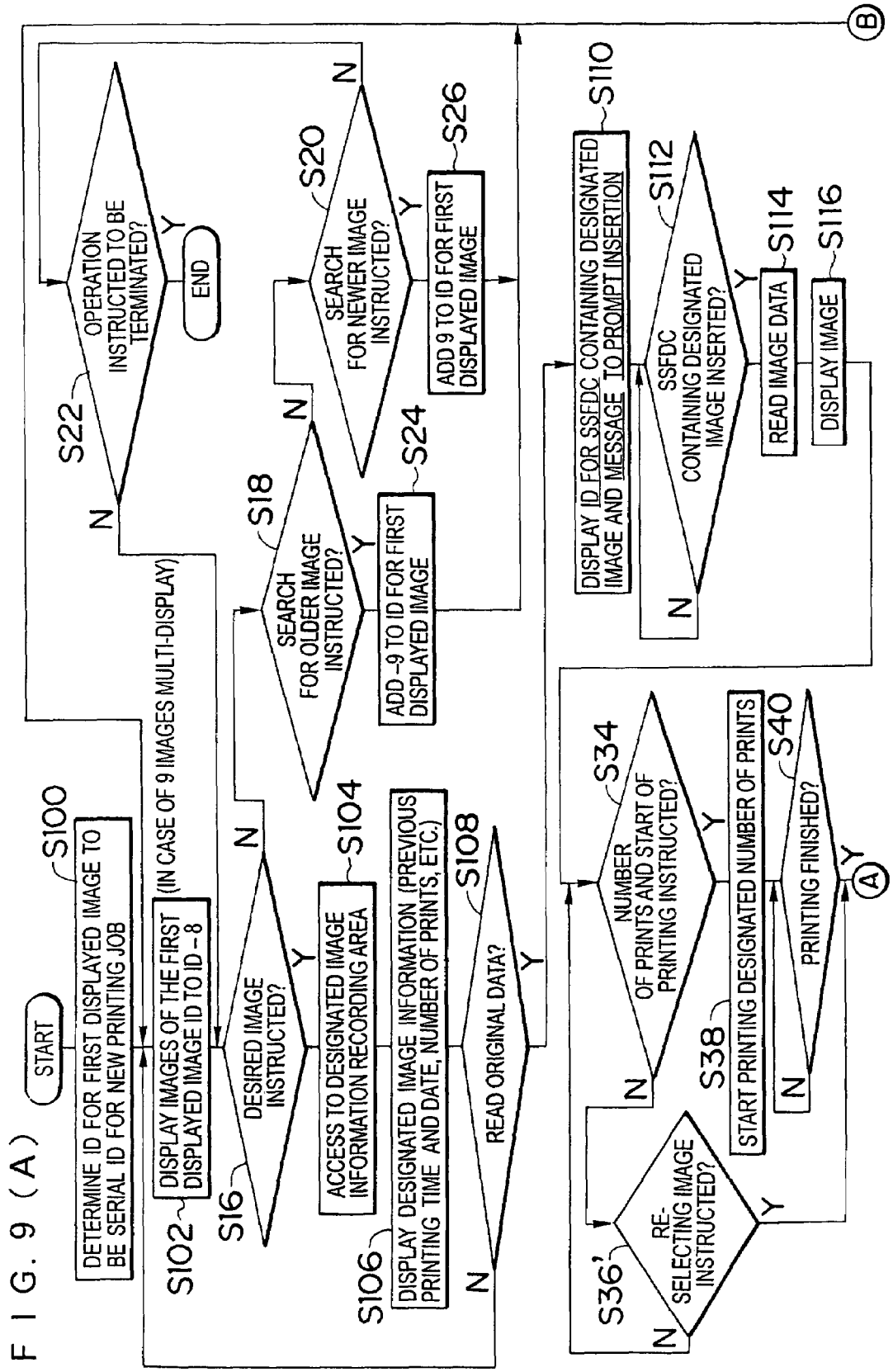
FIGS. 9(A) and 9(B) are a flowchart showing the sequence of a printer for recording the job information of the selected image in case of reprinting an image printed before using the job information.
Figure 9:
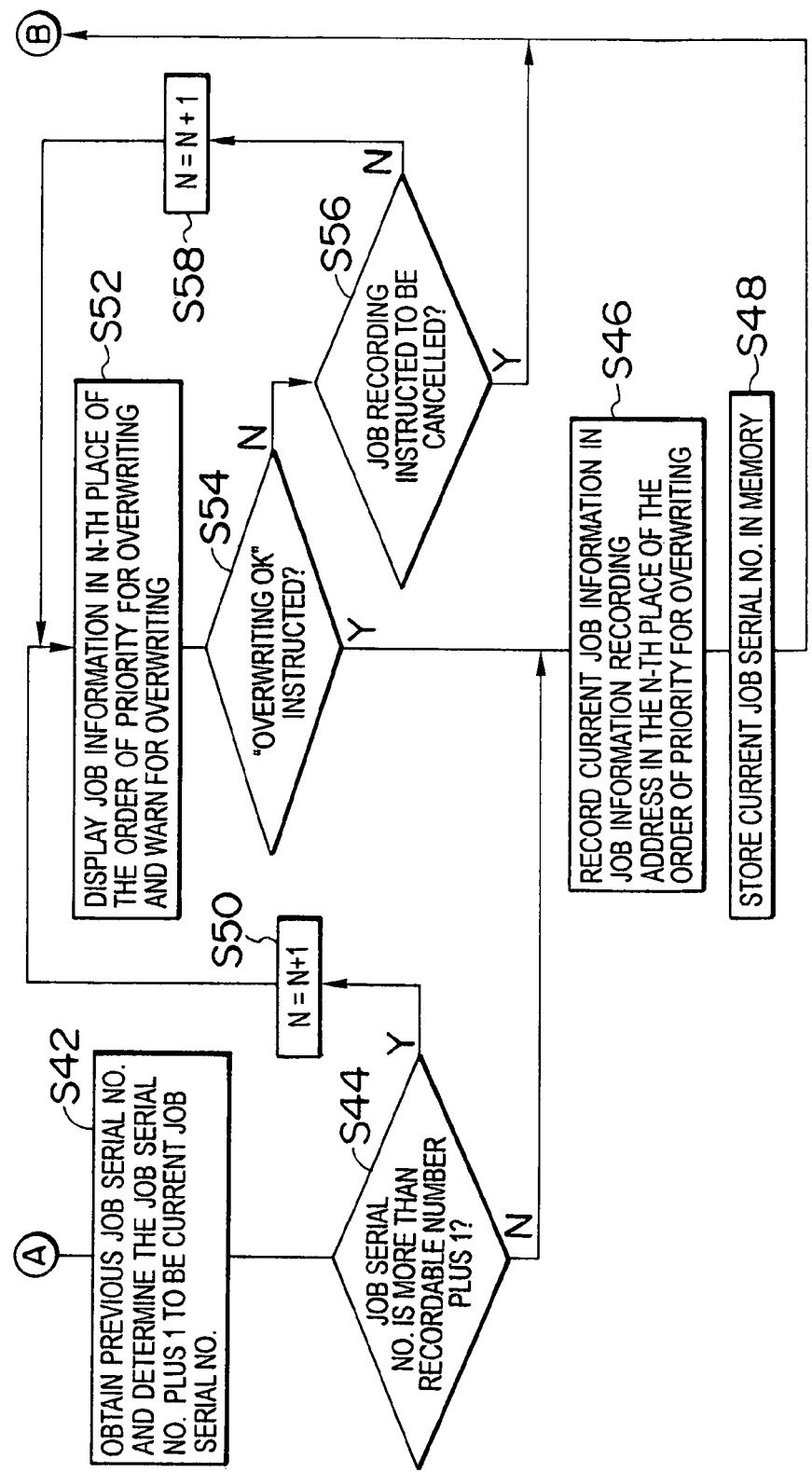

FIGS. 9(A) and 9(B) are a flowchart showing the process sequence in case of reprinting the image which is selected once by using the job information. The flowchart is almost the same as one shown in FIGS. 6(A) and 6(B), and the parts on which the same process is performed are assigned the same numbers. The only difference is S36; S36 in this flowchart is S36' like the one in FIG. 8(A).

Explaining briefly from the first process, the system controller 10 reads the thumbnail images of the job information which is recorded in the memory 36 and displays on the LCD 30 the reprinting image selecting screen like the one described above (S102). In the reprinting image selecting screen, frames of the thumbnail images on the LCD 30 may be presented in a different color in order to identify at a first glance whether or not the image on the reprinting image selecting screen is the printed image or the image which is only selected. Moreover, the image may be identified by displaying the number of prints beside each of the thumbnail images. After the process, when the user selects the desired image to be printed (S16), the system controller 10 reads out the job information of the image from the memory 36 (S104), and displays the job information on the LCD 30 (S106). When the SSFDC 26 in which the designated image is recorded is inserted into the SSFDC slot 24 (S112), the system controller 10 reads the image data of the designated image from the image file of the SSFDC 26 (S114), and displays the image on the LCD 30 (S116).

Next, the system controller determines whether or not the number of prints and start of printing are instructed (S34), and if the answer is NO, the system controller 10 determines whether or not the image reselecting is instructed (S36'). If the system controller 10 determines the answer to be YES at S36, that is, if printing of the selected image is cancelled, the system controller 10 returns to S102 in the flowchart shown in FIG. 6(A) without recording the job information and displays again the reprinting image selecting screen. However in this embodiment, the system controller 10 changes to S42 like the flowchart shown in FIGS. 8(A) and 8(B), and executes the process for recording the job information. Thereby the job information in terms of the image which is selected in the first reprinting image selecting screen, that is, the image which image data are captured, can be recorded without actually reprinting the image. The system controller 10, when the process for recording the job information indicated in S42 through S58, returns to S14, and displays again the reprinting image selecting screen. In addition, the system controller 10 performs the process for recording the job information for the image on which reprinting is executed like the one in the flowchart in FIG. 6(B).

Figure 10:
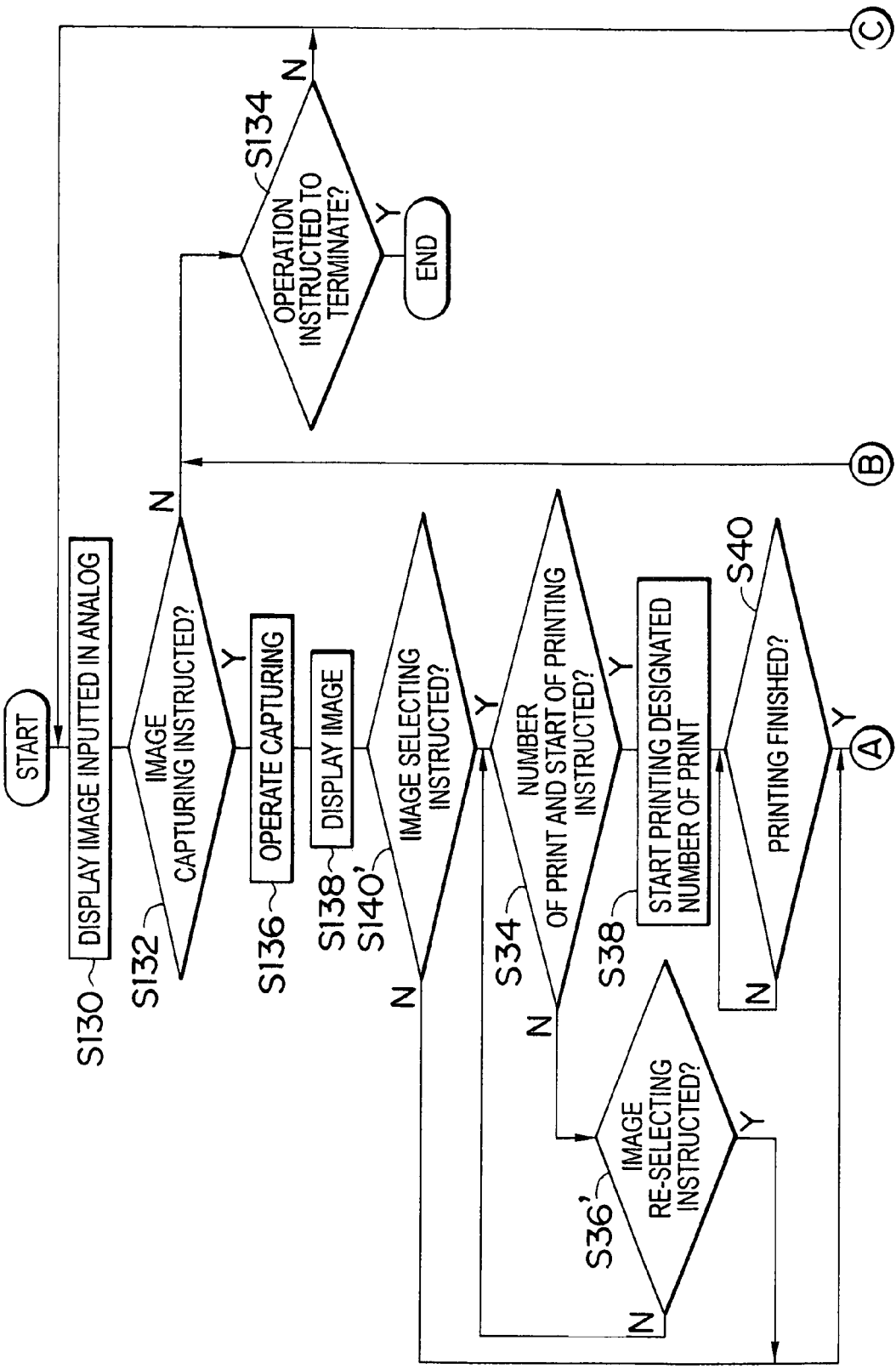
FIGS. 10(A) and 10(B) are a flowchart showing the sequence of a printer for recording the job information of the selected image in case of reprinting, using the job information, an image which is inputted from an analog signal input terminal of the printer.

FIGS. 10(A) and 10(B) are a flowchart showing the sequence for printing for the first time the analog image which is inputted from the analog signal input terminal 38 of the printer. The flowchart is almost identical to one shown in FIGS. 7(A) and 7(B), and the parts to which the same process is performed are assigned the same numbers as the ones in FIGS. 7(A) and 7(B). The different parts are only S36 and S140; in this flowchart, these steps are S36' and S140', respectively.

Explaining briefly from the first process, the system controller 10 captures the analog image (S136), displays the image on the LCD 30 (S138), and determines whether or not selecting the image is instructed (S140'). At this point, if the answer is NO, that is, if capturing the image is performed again, the system controller 10 returns to S130 in the flowchart shown in FIG. 7(A) without executing the process for recording the SSFDC of the taken image and the process for recording the job information, and executes from the process of capturing the image data. However in this embodiment, the system controller 10 changes to S142 and executes the process for recording the SSFDC of the taken image (S142–S144), then executes the process for recording the job information (S42–S58). After that, the system controller 10 returns to S130.

Compared to that, if the answer is determined to be YES at S140', the system controller 10 determines whether or not the number of prints and start of printing are instructed (S34), and if the answer is NO, determines whether or not reselecting the image is instructed (S36'). If the answer at S36' is determined to be YES, that is, if printing of the selected image is cancelled, the system controller 10 returns to S130 in the flowchart shown in FIG. 7(A) without executing the process for recording the taken image to the SSFDC and recording the job information, and executes from the process of capturing the image data. However, in this embodiment, the system controller 10 changes to S142 and executes the process for recording the taken image to the SSFDC (S142–S144), then executes the process for recording the job information (S42–S58). After that, the system controller 10 returns to S130. Thus, even if the image is an analog image which is not actually printed, the taken image can be recorded in the SSFDC and the job information can be recorded in the memory 36. Similarly with the flowchart shown in FIGS. 7(A) and 7(B), after the answer is determined to be YES at S34, the system controller 10 performs to the image, to which printing is executed, the process beginning from S142 for recording the image file to the SSFDC and the process for recording the job information. As explained above, the SSFDC is used for the recording medium; however such a recording medium is not limited. Other recording medium may be used which are an IC card such as a compact flashing card and a PC card, a magnetic disk, a magnetic tape, and a laser disk. FIG. 11 shows the structure of the printer to which a magnetic disk can be used as a recording medium. Contrary to the printer in FIG. 1, the printer in FIG. 11 can read in the system controller 10 the image data which is recorded in a magnetic disk (FD) 48 via an FD controller 50.

Figure 12:
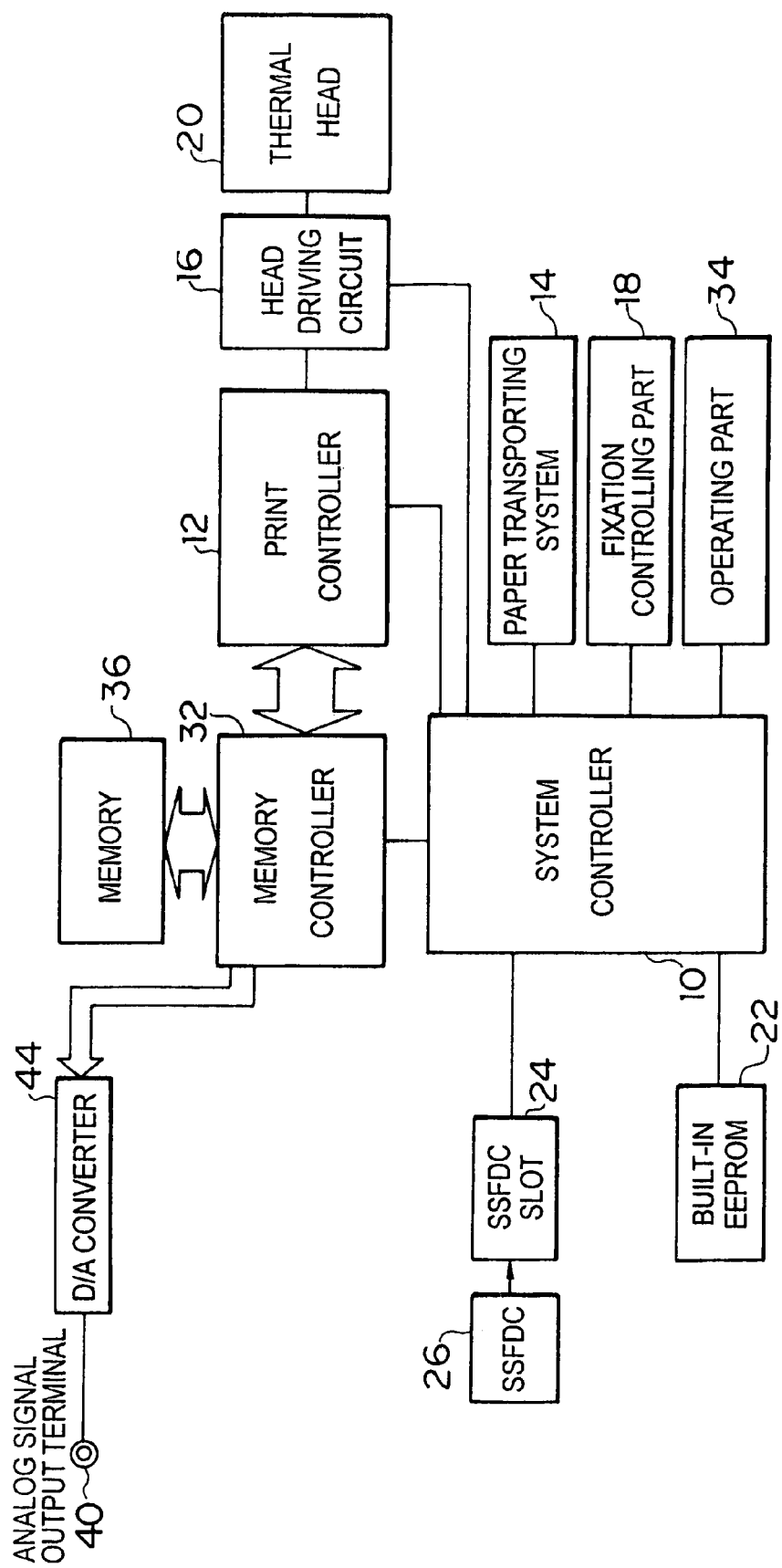
FIG. 12 is a block diagram showing another embodiment of the printer of the present invention.

In the above-described embodiment, the printer can receive the analog image from the analog signal input terminal; however, the printer in the present invention may be a printer without an analog signal input terminal. Further, in the above-described embodiment, the printer has the LCD 30; however the present invention may be applied to a printer which can display the same screen displayed on the LCD 30 by connecting a monitor to the analog signal output terminal 40 even if the printer is without the LCD 30. FIG. 12 shows a printer without the LCD 30 and the analog signal input terminal, and FIG. 13 shows a printer without the analog signal input terminal. The present invention may be applied to both of these printers in FIGS. 12 and 13.

Furthermore, in the above-described embodiment, the job information is recorded in the memory 36 installed in the printer; however, in the combination with this feature, or instead of this feature, a recording medium such as a memory for image cashing, a memory card, a PC card, or a magnetic recording medium may be built in or mounted in the printer. Thus, the image, selected or printed before, can be easily taken out by recording the image data in the recording medium, without using the original image file. In this case, the number of pixels of the image to be contained may be compressed information of pixels in the least number which are necessary for printing.

In the above-described embodiment, the explanation is given to a printer which can directly mount an external recording medium such as the SSFDC; however, the present invention can also be applied to a printer for capturing the image data recorded in the external recording medium via another device such as a personal computer, and performs printing.

As explained above, according to the present invention, the image captured in the printer or the identification information of the printed image can be recorded and the identification information can be displayed. Thus, an image, captured or printed before can be efficiently found by the identification information, and the image can be quickly printed.

Further, summarized data (thumbnail and tag of each type) of the image taken or printed before, and the number of prints can be managed and comprehended referring to the identification information.

Additionally, the recording capacity of the memory for recording the identification information can be reduced by recording the information related to the image instead of recording the image itself for the identification information.

It should be understood, however, that there is no intention to limit the invention to the specific forms disclosed, but on the contrary, the invention is to cover all modifications, alternate constructions and equivalents falling within the spirit and scope of the invention as expressed in the appended claims.

The invention claimed is:

1. A printer which captures an image from an external detachable recording medium and prints the image, comprising:
    a recorder which records identification information of a captured image after said captured image has been printed, said identification information including a thumbnail image of said captured image and information indicating the external detachable recording medium in which said captured image is recorded; and
    a display which displays the identification information recorded by the recorder.

2. The printer as defined in claim 1, wherein the identification information is an identification number of the external detachable recording medium containing the captured image and the thumbnail image including the captured image.

3. The printer as defined in claim 1, wherein the identification information is displayed so that an image which has already been printed and an image of which printing is cancelled can be distinguished.

4. The printer as defined in claim 1, further comprising a selector which makes the recorder record only the identification information of a desired image among images which are captured from outside.

5. The printer as defined in claim 1, wherein the recorder records only the identification information of an image which has already been printed among images which are captured from outside.

6. The printer of claim 1, wherein said display is a liquid crystal display coupled to a controller that generates an output based on a command from said printer.

7. The printer of claim 1, wherein said identification information is recorded in an external smart media memory storage device configured to interface with said printer.

8. The printer of claim 7, wherein said external smart media memory storage device is a solid state floppy disk card.

9. A method of managing at least one image captured from an external detachable recording medium, comprising:
    printing a selected one of at least one captured image; and
    recording identification information of the selected captured image after said printing in a memory storage device, said identification information including a thumbnail image of said captured image and information indicating the external detachable recording medium in which said captured image is recorded.

10. The method of claim 9, further comprising using said recording identification information to re-print said printed, captured image.

11. The method of claim 9, wherein said at least one captured image is selected from a plurality of thumbnail images.

12. The method of claim 9, said recording further comprising:
    recording current job information in a job information recording address; and
    storing a unique identifier associated with the current job information.

13. The method of claim 12, further comprising:
    when said memory storage device is full, overwriting another job information in another job information address to store said current job information.

14. A computer readable medium configured to store instructions for managing at least one image captured from an external detachable recording medium, said instructions comprising:
    printing a selected one of at least one captured image; and
    recording identification information of the selected captured image after said printing in a memory storage device, said identification information including a thumbnail image of said captured image and information indicating the external detachable recording medium in which said captured image is recorded.

15. The computer readable medium of claim 14, further comprising using said recording identification information to re-print said printed, captured image.

16. The computer readable medium of claim 14, wherein said at least one captured image is selected from a plurality of thumbnail images.

17. The computer readable medium of claim 14, said recording instruction further comprising:
    recording current job information in a job information recording address; and
    storing a unique identifier associated with the current job information.

18. The computer readable medium of claim 14, further comprising:
    when said memory storage device is full, overwriting another job information in another job information address to store said current job information.

* * * * *